United States Patent [19]

Baker

[11] 4,151,791

[45] May 1, 1979

[54] ENERGY CONSERVING BROILER

[75] Inventor: Edward D. Baker, San Francisco, Calif.

[73] Assignee: NPI Corporation, Burlingame, Calif.

[21] Appl. No.: 871,245

[22] Filed: Jan. 23, 1978

[51] Int. Cl.² ............................................. A47J 37/06
[52] U.S. Cl. ........................................ 99/339; 99/386;
99/391; 99/400; 99/401; 219/388; 219/405
[58] Field of Search ................. 99/386, 387, 389, 391,
99/443 C, 393, 401, 447, 400, 446, 339; 126/41
C; 219/388 C, 347, 405

[56] References Cited

U.S. PATENT DOCUMENTS

| | | | |
|---|---|---|---|
| 2,238,309 | 4/1941 | Cramer | 99/386 |
| 2,917,990 | 12/1959 | Ehrenberg | 99/386 |
| 3,340,794 | 9/1967 | Giuliano | 99/386 |
| 3,580,164 | 5/1971 | Baker | 99/386 X |
| 4,023,007 | 5/1977 | Brown | 99/386 X |

Primary Examiner—Billy J. Wilhite
Attorney, Agent, or Firm—Lothrop & West

[57] ABSTRACT

An energy conserving broiler has a frame supporting a housing having a patty opening and a bun opening therein. The upper run of an endless conveyor is disposed adjacent the patty opening. Two arrays of spaced heater elements are on the frame above and below the upper run of the conveyor. Radiant heat reflecting partitions are disposed between the elements of each array and double wall radiant heat reflectors are disposed above and below the two arrays. A deflector wall is positioned between one of the arrays and the patty feed opening. A bun conveyor is on the frame near the bun feed opening. A bun heater is above the bun conveyor. A patty receiving device for reflecting heat upwardly is disposed between the heater element array below the upper run of the conveyor and the bun heater.

7 Claims, 3 Drawing Figures

ENERGY CONSERVING BROILER

BRIEF SUMMARY OF THE INVENTION

There is provided an arrangement for cooking meat patties, buns and the like in a small device capable of handling the patties and heating buns serially. As much as possible is conserved of the radiant energy emanating from the electrical heating elements or rods, normally disposed in the immediate vicinity of the patty broiler. Openings into the casing on the frame are relatively small and are shielded from radiant emanation by intervening radiant energy reflecting devices. These radiant devices are generally above and below an upper run of an endless conveyor utilized for carrying the patties through the machine and are specially shielded. Similar arrangements are provided for the bun portion of the mechanism. The amount of electrical energy utilized to provide suitable patty and bun products is substantially reduced or conserved over amounts heretofore used under comparable circumstances. The amount of heat leaving the machine is reduced and so saves some costs of ventilating or cooling the machine surroundings. Further, the device is adaptable to various installations, both those which utilize a flow through traffic pattern and those which utilize a return traffic pattern.

DETAILED DESCRIPTION

Figure 1:
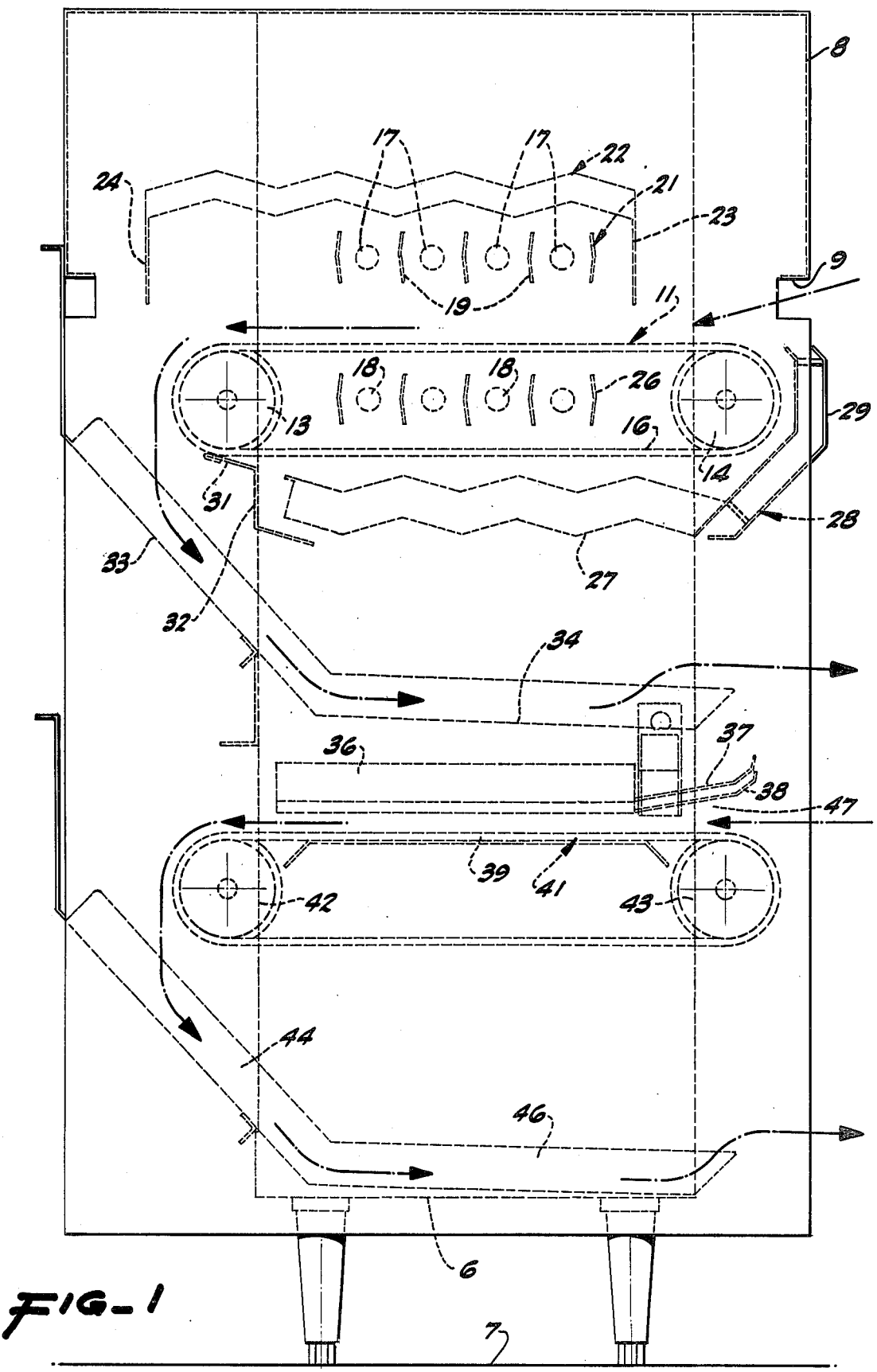
FIG. 1 is a side elevation, of an energy conserving broiler constructed in accordance with the invention.
Figure 2:
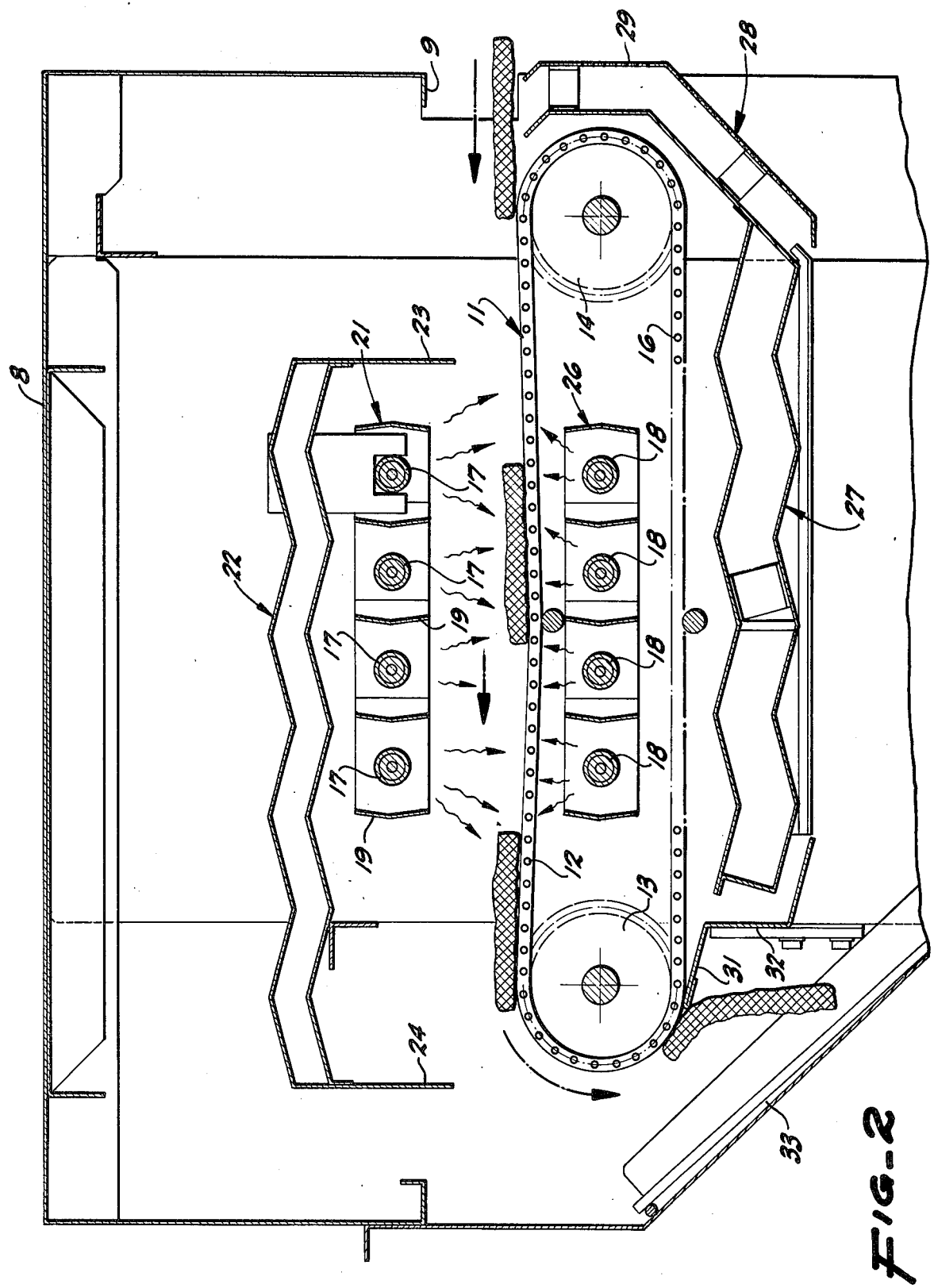
FIG. 2 is an enlarged view of the upper portion of FIG. 1 and showing many of the parts in section on a vertical, longitudinal plane.

Although the energy conserving broiler has a number of different applications and rather extended uses in various environments, it has been especially adapted for use in the preparation of hamburger patties by broiling and the preparation of the buns that usually accompany such patties. Devices of this sort utilize either gas or electricity for their heat supply. In order to conserve the heating energy as much as is presently feasible, particularly in connection with electric installations, there is provided an arrangement as disclosed herein in a form suitable for relatively small installations.

Included in the device is a frame 6 adapted to be supported on the floor 7 in the customary way and made up of various structural elements, not shown in detail. Resting on and supported by the frame 6 is a generally rectangular housing 8 preferably of stainless steel or comparable material. The housing is provided with at least a patty feed opening 9 of an extent to receive a hand-delivered patty. The opening 9 is adjacent an endless conveyor 11 mounted on the frame 6 and extending for much of the length of the housing. The conveyor 11 includes an upper run 12 trained around a pair of sprockets 13 and 14 also supporting the lower run 16 of the conveyor 11. The conveyor is power driven to advance for substantially the length of the housing in a time adequate to broil patties arranged on the upper run 12.

In order to afford a source of broiling heat, a number of heater elements 17 are arranged on the frame extending transversely to the direction of advance of the upper run 12. The elements are spaced apart a convenient distance to afford radiation of energy in a predetermined, generally uniform amount onto the upper run 12 and onto material thereon. The heating elements 17 are approximately supplied with electricity by circuitry and controllers (not shown) in the customary way. The arrangement of the heating elements 17 is such that they form an array in a generally horizontal plane parallel to the upper run 12 and spaced thereabove a selected distance.

Somewhat similarly, beneath the upper run 12 and mounted on the frame is a second array of heating elements 18 connected as are the elements 17 and effective to produce simultaneous bottom broiling of the patties on the largely open conveyor 11.

Particularly pursuant to the invention and in order carefully to conserve energy as well as to provide a substantially improved distribution of radiant energy in the device over energy saving and distribution heretofore available, there is provided in the space between each pair of the elements 17 one of a number of radiant heat partitions 19. These are disposed between the individual elements and also at or beyond the ends of the array. The positioning of the partitions 19 is such that radiation from the elements 17 tends to be confined in vertically directed, nearly parallel paths. There is some lateral spreading near the top of the conveyor upper run 12, but very little of the downwardly directed radiation has a substantial lateral or longitudinal component.

In addition, there is also provided above the array 21, made up of the partitions between and at the ends of the elements 17, a double wall, radiant heat reflector 22. This is supported on the frame at a convenient distance just above the array 21 and is effective to intercept and reflect radiant heat from the elements that initially travels upwardly. The intercepted and reflected heat is then directed downwardly through and between the several partitions 19 and onto material on the upper run 12 of the conveyor.

The conveyor discharges patties that are at a relatively high temperature and themselves cause some reradiation. Consequently, the double wall, radiant heat reflector 22 is extended so that it overlies the sprockets 13. Much of the heat that otherwise would rise upwardly and be dissipated into the upper portion of the housing is returned to the materials being broiled on the conveyor.

At both ends, preferably, of the double wall reflector 22, there are dependent, deflector walls 23 and 24. The wall 23 is especially important, since it extends downwardly toward the conveyor about as far as it can without physically interfering with the advance of patties on the conveyor and is interposed between all of the radiating elements 17 and the patty feed opening 9. The deflector 23, therefore, is particularly effective in preventing radiation of cooking heat out of the housing through the opening 9.

It has been found that a double wall, radiant heat reflector 22 is substantially more effective than a single wall reflector. The double wall reflector is made up of sheets that are substantially corrugated in order to afford a number of planar surfaces reflecting in different directions. The net result of this is that not only is radiant heat generally contained and reflected back toward the materials being cooked, but also the radiation onto such materials is more nearly uniform than it would be were there simply heat elements 17 spaced apart in the positions shown.

In a somewhat similar fashion and especially for reflecting heat from the elements 18 making up the lower array 26, there is a second double wall reflecting element 27. The radiant heat reflector 27 is comparable to the reflector 22; but the sheets or plates thereof are somewhat more widely spaced in a vertical direction, and the position is more nearly toward the front of the housing.

Furthermore, instead of simply terminating the second radiant heat reflector 27 substantially under the sprockets 14, there is provided an additional, augmenting radiant heat reflector 28. This can be detachably secured to the reflector 27 and extends upwardly and outwardly around much of the pulley 14 and terminates close to the patty feed opening 9. The purpose is not only to reduce the extent of the opening 9 as much as possible but also to reflect back into the machine radiant heat that might otherwise escape. Preferably, the additional double wall reflector 28 is made with its front or outer wall 29 of a heat-dissipating, perforated metal so that an operator, manually depositing patties through the opening 9, is protected from excessive heat and being accidentally burned.

In the operation of the structure as described, initially raw patties advance along with the conveyor until they are appropriately broiled and then roll over the sprockets 13 at the far end of the conveyor. Under many circumstances the patty being cooked simply falls off tangentially and by gravity from the conveyor chains as the chains round the sprockets 13. Sometimes, however, the patties tend to stick to the cross bars or other elements of the conveyor. For that reason there is provided underneath the pulley sprockets 13 and in substantial contact with the lower run 16 of the conveyor a doctor blade 31 adapted to intervene between a patty and the chain mechanism. A preferred position for the doctor blade is at a point whereat the chains finish rounding the sprockets 13 and start to straighten out for the lower run 16. The doctor blade 31 is especially augmented to extend downwardly far enough to form a distinct radiant heat barrier 32 partially underlying the mechanism 27. The doctor blade 31 and its extension thus also serve as a barrier to heat radiating from the vicinity of the conveyor.

Patties dropping off of or dislodged from the conveyor fall by gravity onto an inclined slide 33, down which they go by gravity to stop somewhere on a pan 34 that is a horizontal extension of the slide 33. From the parking area on the pan 34 there is access to the outside of the housing so that completed patties can be removed from the pan 34. The effect of the barriers 27 and 32 is to permit just sufficient heat to travel downwardly to the pan 34 to maintain the patties thereon at substantially their keeping temperature but without wasting cooking energy.

It is not always necessary to supply means for toasting buns or half buns in the same patty cooking machine, but it is often most convenient and economical to do so. Consequently, there may be provided in the housing a bun platen 36 or cooker that is likewise supplied with electrical energy. The bun cooker extends across and is supported on the frame just below the pan 34. The lower platen face is located adjacent to upper guides 37 and 38 disposed to intercept radiant heat. The pair of guides is arranged just above the upper run 39 of a second, endless conveyor 41 having chains trained about sprockets 42 and 43 on shafts disposed parallel to but much below the shafts for the conveyor 11. Further, below the conveyor 41 there is a receiving incline 44 merging smoothly with a pan 46 for receiving toasted buns. Access to the pan 46 is had through the open front of the machine. In this portion of the device the bun platen 36 radiates heat both upwardly and downwardly. The downwardly traveling heat is effective to toast the bun halves on the conveyor upper run 39. The lower face of the platen 36 is augmented by the plates 37 and 38 so that not only is there an easy entrance for the bun portions but also so that heat radiating from the platen 36 is barred from escaping in any substantial amount from the bun opening 47.

Buns discharging from the conveyor or around the sprockets 42 fall onto the incline 44 and continue downwardly by gravity until they come to rest on the pan 46. Their temperature is maintained by heat radiating downwardly from the platen 36. The slide 33 and the pan 34 are of reflecting or bright metal to maintain a fairly sharp temperature distinction between the patty preparing portion and the bun toasting portion by interfering with radiation upwardly from the platen 36 and downwardly from the barrier 27. However, the bottom of the pan 34 may be dull and a good conductor. Patties on the pan 34 can thus be heated in part by radiation from the platen 36.

Figure 3:
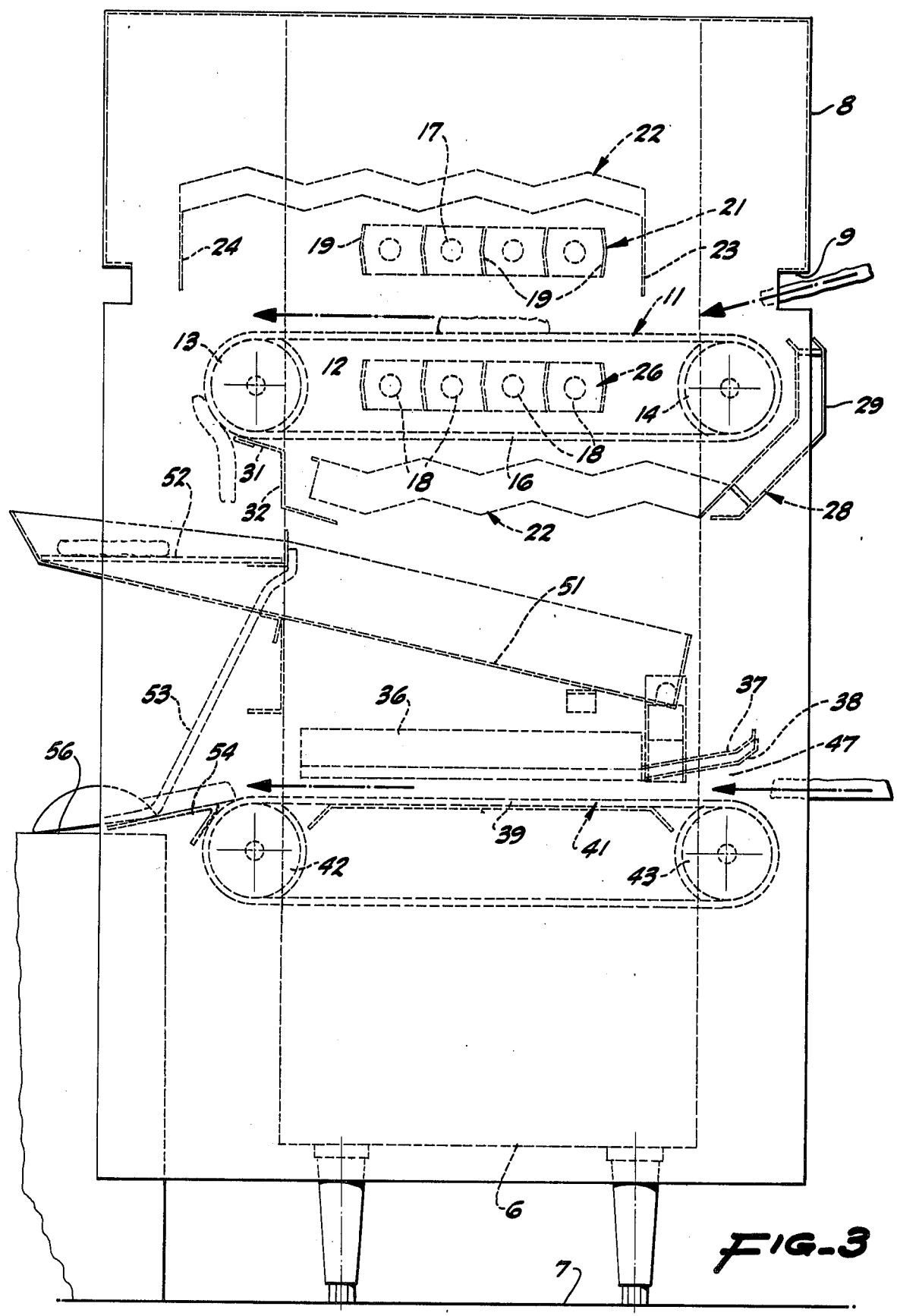
FIG. 3 is a view comparable to FIG. 1 but showing a rearrangement of the structure to produce a flow through rather than a return traffic pattern.

In some instances it is desired to arrange the mechanism so that the patties and buns do not return to the feeding end. Thus, as shown particularly in FIG. 3, instead of utilizing the inclined slide 33 and the storage pan 34 or the inclined slide 44 and the storage pan 46, those elements can readily be eliminated and replaced by a patty storage pan 51 resting on the frame 6 and disposed between the reflector 27 and the bun heater 36. The storage pan 51 is preferably made of a bright material such as polished stainless steel. The pan 51 acts as a barrier for radiant heat flow between the various sources of heat above it and below it. The pan 51 in this instance is particularly provided with a generally horizontal openwork tray 52 in a position to catch a patty falling from the cooking chain and holding the patty so that liquids can drain therefrom into the downwardly inclined pan.

On the frame are some detachable brackets 53 effective to support a receiving plate 54 intended to lie just above a finishing table 56 that can readily fit within a portion of the frame 6. Buns coming from the upper run 39 of the lower conveyor 41 are discharged onto or near to the table 56. In this fashion the thermal insulation of one part of the machine from the other is still maintained, even though the machine has readily been converted from a return flow machine to a through flow machine. The construction described is substantially identical in both instances except for the provision of the type of product handling, either by the inclined slide 33 and the pan 34 and by the inclined slide 44 and the pan 46 or by the pan 51 and the plate 54. In both instances, therefore, the operation of the structure continues with a small escape of energy, particularly radiant energy, and with a large and effective use of the radiant energy from the various sources in the indicated arrays. The arrays are effective not only to reduce heat losses but also to redirect radiant heat particularly so that there is a more nearly even distribution of temperature especially evidenced in producing uniformity in patty cooking and finish, the effect being largely along the direction of advance of the patties. There is an overall, more effective usage of the heat available, there is an increased uniformity in the preparation of the products, and there is far less than usual heat dissipated from the machine into the surrounding room.

I claim:

1. An energy conserving broiler comprising a frame, a housing on same frame, means in said housing forming a patty feed opening, an endless patty conveyor having an upper run and a lower run, means for mounting said conveyor on said frame with said upper run adjacent said patty feed opening, an array of spaced heater elements on said frame and disposed above said upper run adjacent the center thereof, radiant heat partitions fixed on said frame and disposed between and spaced from said heater elements, a double wall radiant heat reflector on said frame above said heater elements, and deflector walls fixed on said frame and disposed at the ends of said array, at least one of said reflector walls being between said array and said patty feed opening.

2. A device as in claim 1 including additional radiant heat partitions at the ends of said array.

3. A device as in claim 1 including a second array of spaced heater elements on said frame and disposed below said upper run adjacent the center thereof, radiant heat partitions on said frame and disposed between said heater elements of said second array, a second double wall radiant heat reflector on said frame below said second array.

4. A device as in claim 3 including an additional double wall radiant heat reflector on said frame and extending substantially between an end of said second double wall radiant heat reflector and said feed opening.

5. A device as in claim 4 in which at least one of the walls of said additional double wall radiant heat reflector is of perforated metal.

6. A device as in claim 3 including a discharge station on said frame adjacent one end of said conveyor, and a radiant heat barrier between said second double wall radiant heat reflector and said discharge station.

7. A device as in claim 3 including means in said housing forming a bun feed opening below said patty feed opening, a bun heater on said frame adjacent said bun feed opening, and a patty pan on said frame for reflecting heat upwardly and disposed above said bun heater and below said second double wall radiant heat reflector.

* * * * *